(12) United States Patent
Bordogna et al.

(10) Patent No.: US 12,160,495 B2
(45) Date of Patent: Dec. 3, 2024

(54) TIMESTAMP ALIGNMENT FOR MULTIPLE NODES

(71) Applicant: Intel Corporation, Santa Clara, CA (US)

(72) Inventors: Mark Bordogna, Andover, MA (US); Jonathan A. Robinson, Portland, OR (US); Srinivasan S. Iyengar, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 284 days.

(21) Appl. No.: 17/475,200

(22) Filed: Sep. 14, 2021

(65) Prior Publication Data

US 2022/0006607 A1    Jan. 6, 2022

Related U.S. Application Data

(60) Provisional application No. 63/130,666, filed on Dec. 26, 2020.

(51) Int. Cl.
*H04L 7/00* (2006.01)

(52) U.S. Cl.
CPC .................................. *H04L 7/0091* (2013.01)

(58) Field of Classification Search
CPC ...... H04L 7/0091; H04J 3/0667; H04J 3/0697
See application file for complete search history.

(56) References Cited

U.S. PATENT DOCUMENTS

| 8,494,009 B2 | 7/2013 | Fourcand |
| 2014/0098684 A1 | 4/2014 | Diab et al. |
| 2014/0269769 A1 | 9/2014 | Gresham et al. |
| 2016/0182332 A1* | 6/2016 | Hansson ............... H04J 3/0667 370/503 |
| 2018/0321706 A1 | 11/2018 | Brown |
| 2019/0044637 A1* | 2/2019 | Gulstone ................. H04J 3/067 |
| 2019/0045475 A1* | 2/2019 | Kasichainula ..... G05B 19/0423 |

(Continued)

FOREIGN PATENT DOCUMENTS

WO     WO-2021115911 A1 *   6/2021   ........... G06F 9/4856

OTHER PUBLICATIONS

Intel, "Timestamp-Counter Scaling for Virtualization White Paper", Reference No. 333159-001, Sep. 2015, 5 pages.

(Continued)

*Primary Examiner* — Deepa Belur
(74) *Attorney, Agent, or Firm* — Compass IP Law PC

(57) ABSTRACT

Examples described herein relate to a first central processing unit (CPU) node to generate time stamp counter (TSC) values based on a first clock signal and a second CPU node to generate TSC values based on a second clock signal. In some examples, the first CPU node is to determine at least one network timer time stamp based on the TSC values based on the first clock signal and the second CPU node is to determine at least one network timer time stamp based on the TSC values based on the second clock signal. In some examples, determine at least one network timer time stamp based on the TSC values based on the first clock signal is based on (i) a relationship between the first clock signal and a network interface device main timer and (ii) a relationship between a network timer source and the network interface device main timer.

18 Claims, 7 Drawing Sheets

(56) References Cited

U.S. PATENT DOCUMENTS

2020/0133330 A1    4/2020  Bordogna et al.
2021/0203427 A1*  7/2021  Ambeskar ............. H04J 3/0697
2021/0303021 A1*  9/2021  Cui ........................ H04L 7/033
2021/0359778 A1*  11/2021  Wang .................... H04W 76/12

OTHER PUBLICATIONS

International Search Report and Written Opinion for PCT Patent Application No. PCT/US21/51584, Mailed Jan. 5, 2022, 14 pages.

* cited by examiner

TIMESTAMP ALIGNMENT FOR MULTIPLE NODES

RELATED APPLICATIONS

The present application claims the benefit of a priority date of U.S. provisional patent application Ser. No. 63/130,666, filed Dec. 26, 2020, the entire disclosure of which is incorporated herein by reference.

The present application is a continuation-in-part of U.S. patent application Ser. No. 16/726,684, filed Dec. 24, 2019, the entire disclosure of which is incorporated herein by reference. U.S. patent application Ser. No. 16/726,684, filed Dec. 24, 2019, claims the benefit of a priority date of U.S. provisional patent application Ser. No. 62/814,203, filed Mar. 5, 2019.

DESCRIPTION

In distributed systems, synchronization of clock signals is used to provide a common timer to synchronize operations. A free running time stamp counter (TSC), based on a crystal clock source (e.g., Always Running Timer (ART)) of a central processing unit (CPU) is available as a reference clock source at a CPU. For a description of the TSC within Intel® Architecture CPU cores, see volume 3, section 17.13.4 of Intel® 64 and IA-32 Architectures Software Developer's Manual (2019), which is incorporated herein by reference in its entirety. A TSC can be clocked from the CPU's crystal clock source, but can be free running and asynchronous to a network timing domain. The network timing domain can be derived from a network clock source, possibly with stratum 1 accuracy. If the TSC and network clock source are asynchronous, synchronizing the TSC and network clock source can be a challenge.

Aligning time stamp counters for CPU nodes to a common network clock source is utilized in execution of distributed applications that rely upon network or global time. For example, in 4G or 5G applications, the radio frames that are sent to the antenna occur every 10 ms with little jitter and base stations are to be synchronized and meet the timing standard at the antenna, which can be +/−1.25 microsecond time alignment.

DETAILED DESCRIPTION

In some scenarios, different virtualized environments may utilize different network timing domains. Some examples provide support in a CPU node for multiple processes utilizing N timing domains (N≥1) based on a same or potentially different primary network clock source. In some examples, a CPU node can support one or more network timing domains for different virtualized environments by providing relationships between a network timing domain (e.g., Institute of Electrical and Electronics Engineers (IEEE) 1588 primary node) and a CPU node's timer. In some examples, a relationship between a network timing domain and a CPU node's timer can be based on (a) a relationship between a network interface device timer and CPU node's timer and (b) a relationship between a network interface device timer and a network timing domain timer. Accordingly distributed applications (e.g., microservices, containers, virtual machines) across multiple CPU nodes can utilize their own unique network timing references.

Various examples can used with distribution of time-oriented applications across CPU nodes such as but not limited to 4G/5G applications, distributed microservices or applications in cloud computing that rely on a network or global time, a centralized node in a Radio Access Network (RAN) where there is one timing reference for all RAN applications, financial transactions such as trading, or execution of virtual machines or containers. Multi-homed environments can apply examples described herein where different non uniform memory access (NUMA) nodes or systems with different time domains.

Figure 1:
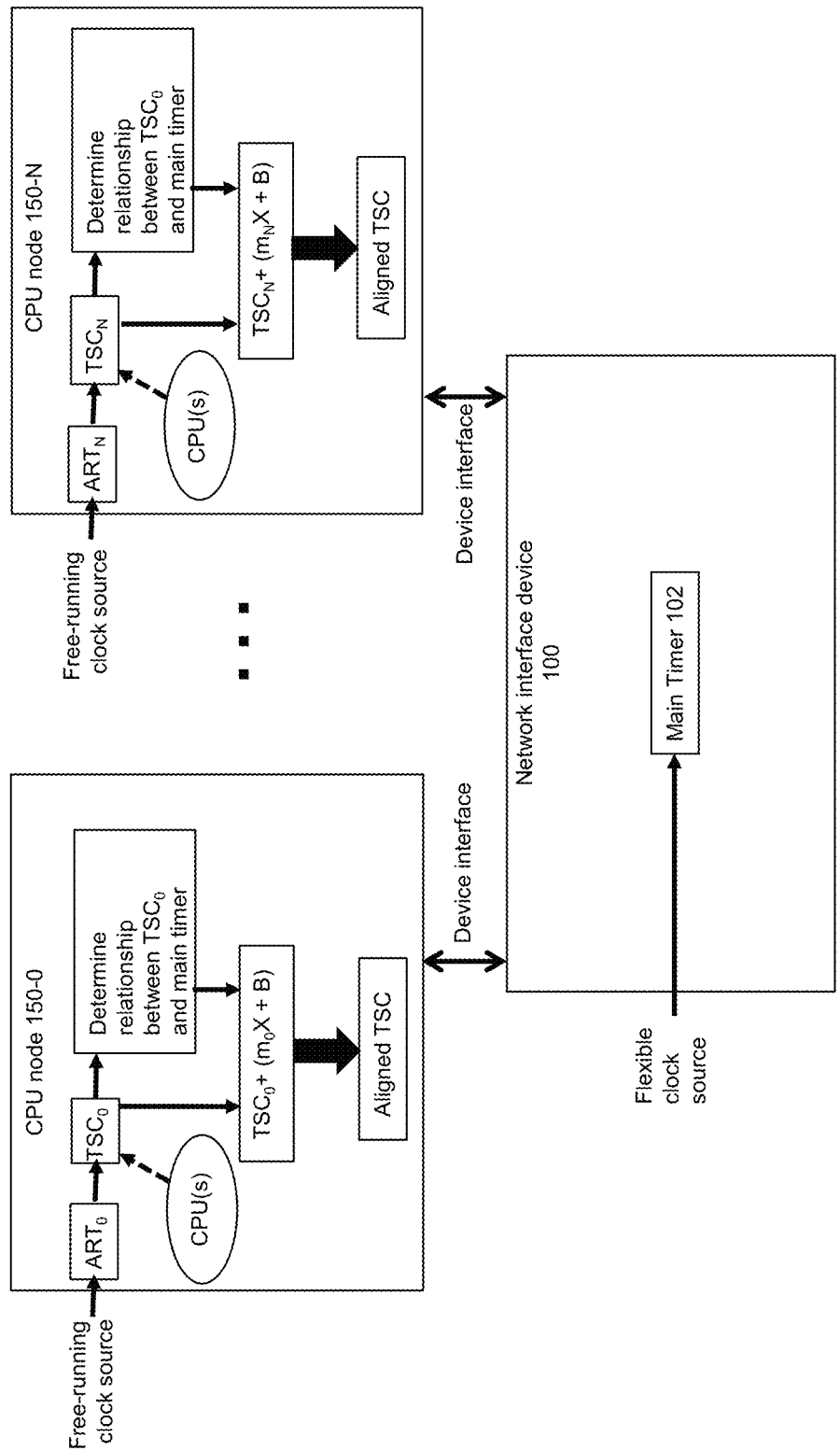
FIG. 1 depicts an example system.

FIG. 1 depicts an example of alignments of a CPU node timer with a main timer. In some examples, an integer N+1 number of CPU nodes access a free running reference (main timer 102) in network interface device 100. CPU nodes 150-0 to 150-N can use this common free running main timer 102 as a reference point to align its unique network time domain based on their ART values to time stamps based on main timer 102. In some examples, CPU nodes 150-0 to 150-N can determine a linear relationship (mX+B) between their ART values to time stamps based on main timer 102 in order to determine an adjustment to their time stamp values to align with main timer 102. For example, an adjusted TSC value can be determined as $TSC_A + m_A X + B$ relationship between main timer and TSC values for CPU node A, where A is 0 to N. Note that the relationship can be recalculated based on newly received TSC and time stamp values from main timer 102. Non-linear relationships between the TSC and time stamp values of main timer 102 can be used such as second order, third order and so forth or any curve fitting. IEEE 1588-2008 or other higher or lower resolution can be applied for time stamps.

A virtualized execution environment can read TSC values of a CPU node that executes the virtualized execution environment for time oriented processing. A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the client or server's CPU, memory, hard disk, network and other hardware resources completely, enabling virtual machines to share the resources. The hypervisor can emulate multiple virtual hardware platforms that are isolated from each other, allowing virtual machines to run Linux and Windows Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings.

Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

A virtualized execution environment can include software that performs Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run as virtual machines (VMs) or in virtual execution environments. VNFs can be linked together as a service chain. In some examples, EPC is a 3GPP-specified core architectures at least for Long Term Evolution (LTE) access. 5G network slicing can provide for multiplexing of virtualized and independent logical networks on the same physical network infrastructure.

Figure 2:
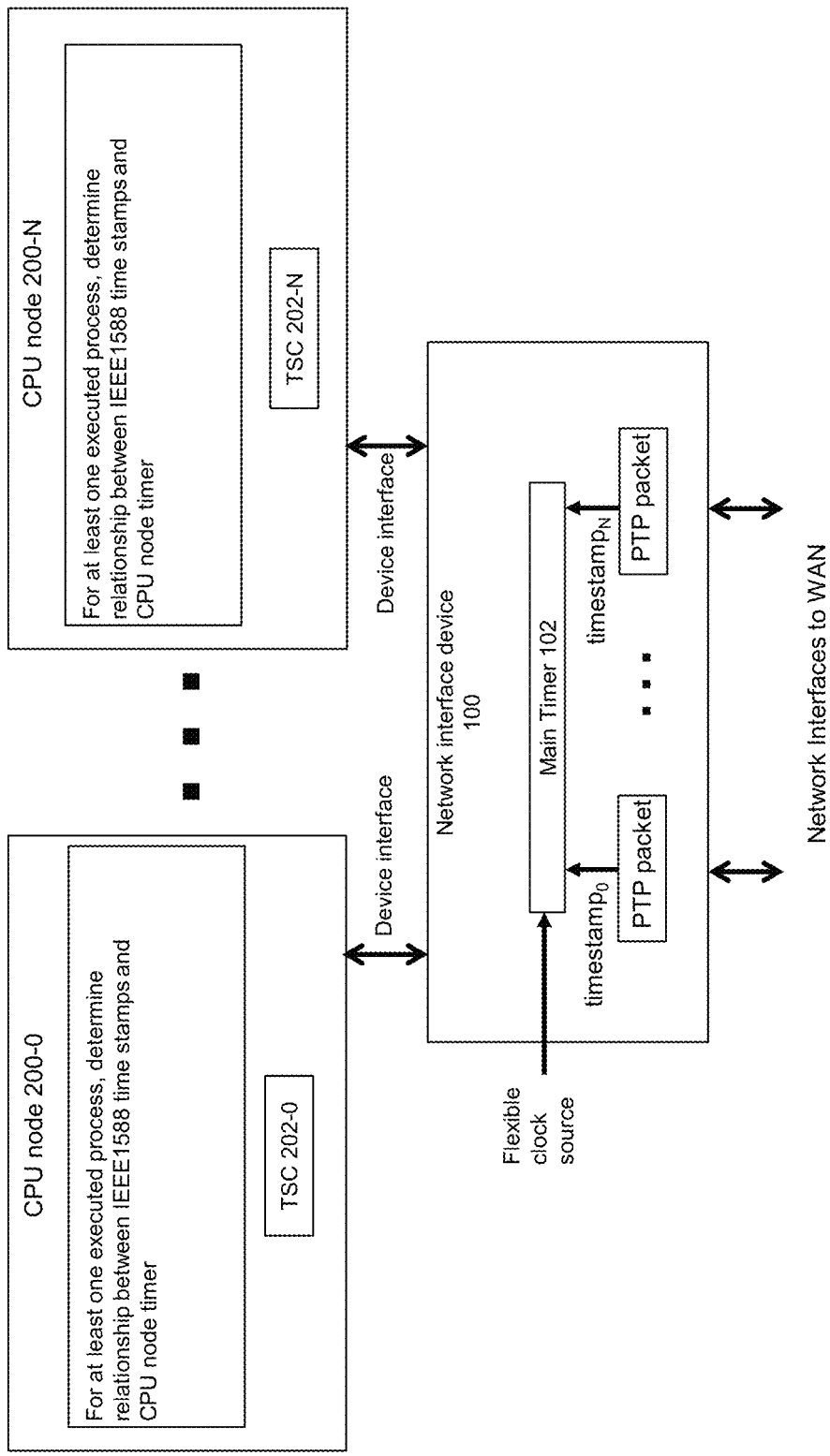
FIG. 2 depicts an example system.

FIG. 2 depicts an example of timing relationship determination between a network timer and CPU node timer. In this example, a CPU node among CPU nodes 200-0 to 200-N can determine a relationship between IEEE 1588 Precision Time Protocol (PTP) time stamps and a respective time stamp values from TSC 202-0 to 202-N. In some examples, the relationship between IEEE 1588 Precision Time Protocol (PTP) time stamps and respective values from TSC 202-0 to 202-N can be based on (a) a relationship between time stamps from main timer 102 and TSC values and (b) a relationship between between time stamps from main timer 102 and a network timing domain timer from PTP time stamps.

For example, network interface device 100 can provide timestamps based on main timer 102 for incoming PTP packets to CPU nodes 200-0 to 200-N. A CPU node among CPU nodes 200-0 to 200-N can read captured main timer timestamps and PTP time stamps and determine a relationship between an IEEE 1588 PTP time stamp and the main timer 102. In addition, CPU nodes 200-0 to 200-N can provide values of TSC 202-0 to 202-N to network interface device 100 and network interface device 100 can provide pairings of values of TSC 202-0 to 202-N against time stamps of main timer 102 to CPU nodes 200-0 to 200-N. CPU nodes 200-0 to 200-N can determine a relationship between TSC values and time stamps of main timer 102 based on the pairings.

CPU nodes 200-0 to 200-N can determine a relationship between IEEE 1588 Precision Time Protocol (PTP) time stamps and respective values from TSC 202-0 to 202-N based on the relationship between time stamps from main timer 102 and TSC values and the relationship between between time stamps from main timer 102 and a network timing domain timer from PTP time stamps. A process (e.g., virtualized execution environment or microservice) executed by a CPU node 200-0 to 200-N can access network timer values derived from TSC values 202-0 to 202-N.

In some examples, different processes executing on a CPU node among CPU nodes 200-0 to 200-N can derive individual and separate relationships between network timer values and TSC values for the CPU node. For example, one or more processes executing on CPU node 200-0 can derive and utilize individual and separate relationships between network timer values and TSC values 202-0. Similarly, one or more processes executing on CPU node 200-1 can derive and utilize individual and separate relationships between network timer values and TSC values 202-1.

Figure 3:
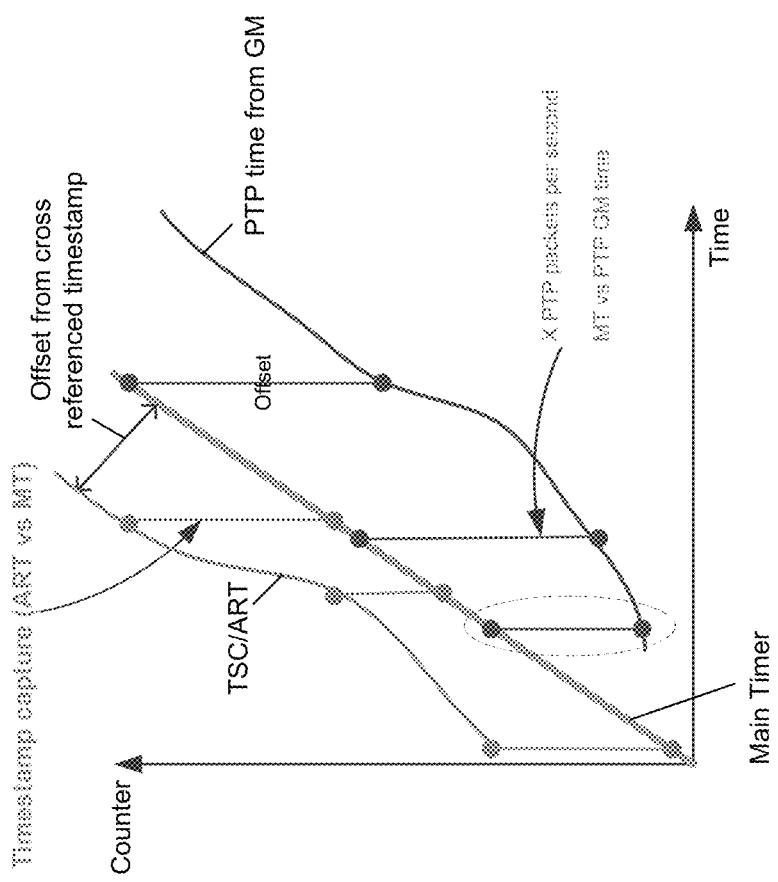
FIG. 3 depicts an example of clock derivation.

FIG. 3 depicts an example of clock derivation. In some examples, a CPU node or process executed on a CPU node can determine (a) relationship between a CPU node's ART and main timer and determine (b) relationship between PTP time and the main timer. In some examples, one or more of the relationships (a) and (b) can be linear relationships, or non-linear relationships. For example, relationship (a) can be $ART=m_1MT+b_1$, where MT represents time stamps from the network interface device main timer, $m_1$ represents a linear coefficient and $b_1$ represents an offset. For example, relationship (b) can be $PTP=m_2MT+b_2$, where MT represents time stamps from the network interface device main timer, $m_2$ represents a linear coefficient and $b_2$ represents an offset. Based on (a) and (b), a CPU node or process executed on a CPU node can determine a relationship (c) between PTP time (network time) and ART/TSC can be generated to predict PTP time stamp values based on ART TSC values. For example, a relationship between PTP time (network time) and ART/TSC can be $PTP=(m_2((ART-b_1)/m_1))-b_2$, although non-linear relationships can be used.

A network interface device can determine time stamps based on a main timer counter which is clocked via an external source (e.g., crystal oscillator) or a reference time (time_ref) based input. For example, in connection with determining relationship (a), a driver executing on a CPU node can trigger the network interface device to take a measurement of a main timer time stamp relative to a TSC via a Memory-mapped I/O (MMIO) write operation. A pair of main timer time stamp and relative TSC value can be stored. The driver can read the pair and compute a slope and offset between ART and main timer time stamp.

In some examples, one or more of multiple different CPU nodes can determine relationships (a) and (b) in order to determine and utilize relationship (c) to determine a PTP time based on a TSC value. Accordingly, on one or more CPU nodes, multiple timing domains can be supported and available using relationships (a), (b), or (c) so that a single CPU node can provide multiple timing domains or multiple CPU nodes can provide multiple timing domains to processes executed thereon.

One or more processes executing on a CPU node can utilize relationship (a), (b), and/or (c) to determine a time stamp value for respective TSC based on main timer, PTP time stamp based on main timer, or PTP time stamp on TSC values. As used herein, a process can refer to a virtualized execution environment, microservice, application, or other software. In some examples, within a CPU node, one or more processes executing on the CPU node can determine relationships (a) and (b) in order to determine relationship (c). One or more processes can utilize its own relationship (c) or multiple processes can share use of a single relationship (c). Note that as relationships between time stamps can change over time, determination of (a), (b), and (c) can be performed after receipt of X number of PTP time stamps, where X can be 1 or more.

Figure 4:
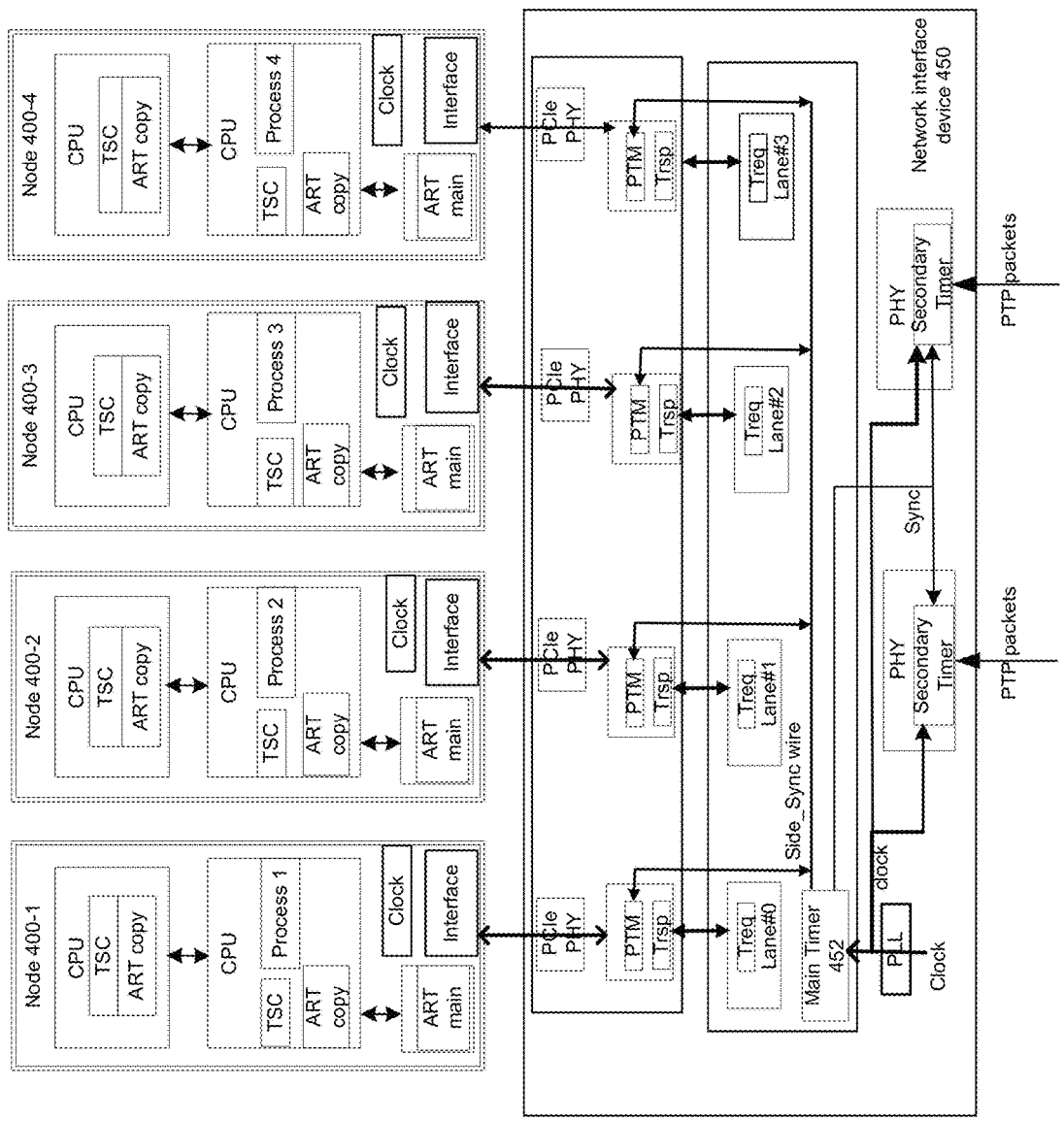
FIG. 4 depicts an example system.

FIG. 4 depicts an example system whereby a network interface device provides time stamps based on a main timer and the four CPU nodes. A CPU node among nodes 400-1 to 400-4 can be connected to network interface device 450 using a device interface such as Peripheral Component Interconnect express (PCIe) or Compute Express Link (CXL). A network interface device can be implemented as one or more of: a network interface controller (NIC) (e.g., endpoint receiver NIC or NIC in a path from sender to receiver), a remote direct memory access (RDMA)-enabled NIC, SmartNIC, router, switch, forwarding element, infrastructure processing unit (IPU), data processing unit (DPU).

Other number of CPU nodes can be connected to the network interface device. A CPU node can include one or more cores. In other examples, devices other than a CPU node can be connected to a network interface device to access time stamps based on a main timer 452 of network interface device 450, such as one or more accelerator devices, one or more graphics processing units (GPUs), one or more GPGPUs, field programmable gate array (FPGA), or application specific integrated circuit (ASIC).

In some examples, PCIe Precision time Management (PTM) can be used to transfer a copy of an ART TSC from a CPU node to network interface device 450. A PCIe interface block can include a requester, Tresponder (Trsp) that interfaces to responder, the Trequestor (Treq) to provide capture of an updated TSC and time stamp value of main timer 452. Network interface device 450 can perform capture of the copy of the ART TSC, adjusted for transit time delay and storage time, and time stamp derived from main timer 452. The CPU nodes can determine a relationship between adjusted ART TSC value and main timer 452 using relationship described herein.

Network time distribution via IEEE 1588 and other protocols can provide time stamps in Ethernet PTP packets. Time stamps from Ethernet PTP packets can be provided with time stamps based on main timer 452 and one or more of CPU nodes 400-1 to 400-4 can determine a relationship between time stamps from Ethernet PTP packets provided with time stamps of main timer 452. Relationships between ART and main timer 452 and PTP and main timer 452 can be determined to predict a PTP value based on a TSC.

Figure 5:
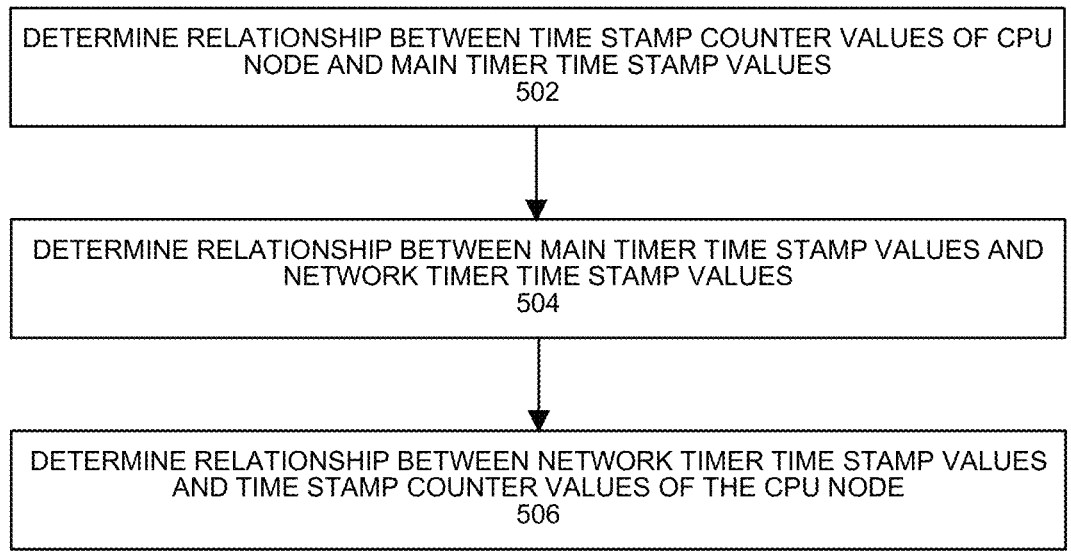
FIG. 5 depicts an example process.

FIG. 5 depicts an example process. The process can be performed by a processor or process to determine a relationship between a PTP value and a TSC generated by an ART associated with the processor. The process can be performed by multiple different CPU nodes connected to receive main timer time stamp values and network timer PTP values from a network interface device. In some examples, one or more processes executed by a CPU node can perform the process described herein. At 502, based on receipt, by a CPU node, of pairs of TSC values and main timer values, the CPU node can determine a relationship between the TSC values and the main timer values. The TSC values can be provided to the network interface device and adjusted to account for propagation time and time to store the TSC values in storage of a network interface device. The TSC value can be determined based on a free running clock available to the CPU node. At 504, based on receipt, by the CPU node, of pairs of main timer values and PTP values, the CPU node can determine a relationship between the main timer values and PTP values. PTP values can be received by a network interface device in Ethernet packets in accordance with IEEE-1588 from a network timer clock source. The main timer can be determined based on a free running clock available to the network interface device. The main timer values paired with PTP values can indicate time of receipt of a PTP packet with the PTP value. At 506, the CPU node can determine a relationship between PTP values and TSC values based on the relationships between TSC values and the main timer values and main timer values and PTP values. The relationship between PTP values and TSC values can be linear or non-linear (e.g., quadratic) relationships. Accordingly, PTP value can be determined based on TSC values and used to time stamp packets or perform operations in a distributed process environment.

Figure 6:
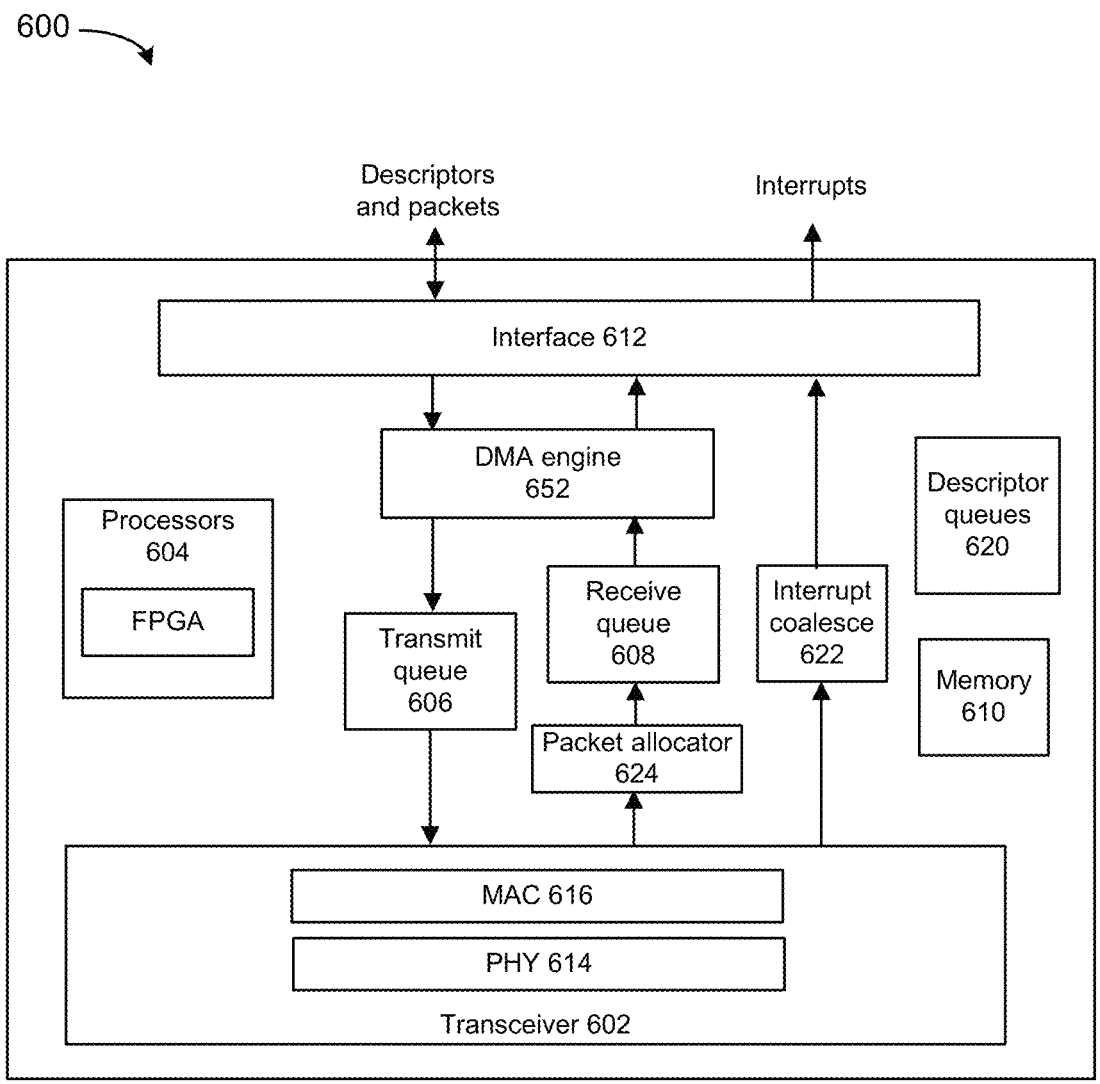
FIG. 6 depicts a network interface.

FIG. 6 depicts an example network interface. Various processor resources in the network interface can perform one or more of: providing main timer values for captured PTP time values and/or TSC values, as described herein. In some examples, network interface 600 can be implemented as a network interface controller, network interface card, a host fabric interface (HFI), or host bus adapter (HBA), and such examples can be interchangeable. Network interface 600 can be coupled to one or more servers using a bus, PCIe, CXL, or DDR. Network interface 600 may be embodied as part of a system-on-a-chip (SoC) that includes one or more processors, or included on a multichip package that also contains one or more processors.

Some examples of network device 600 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 600 can include transceiver 602, processors 604, transmit queue 606, receive queue 608, memory 610, and bus interface 612, and DMA engine 652. Transceiver 602 can be capable of receiving and transmitting packets in conformance with the applicable protocols such as Ethernet as described in IEEE 802.3, although other protocols may be used. Transceiver 602 can receive and transmit packets from and to a network via a network medium (not depicted). Transceiver 602 can include PHY circuitry 614 and media access control (MAC) circuitry 616. PHY circuitry 614 can include encoding and decoding circuitry (not shown) to encode and decode data packets according to applicable physical layer specifications or standards. MAC circuitry 616 can be configured to perform MAC address filtering on received packets, process MAC headers of received packets by verifying data integrity, remove preambles and padding, and provide packet content for processing by higher layers. MAC circuitry 616 can be configured to assemble data to be transmitted into packets, that include destination and source addresses along with network control information and error detection hash values.

Processors 604 can be any a combination of a: processor, core, graphics processing unit (GPU), field programmable gate array (FPGA), application specific integrated circuit (ASIC), or other programmable hardware device that allow programming of network interface 600. For example, a "smart network interface" or SmartNIC can provide packet processing capabilities in the network interface using processors 604.

Processors 604 can include a programmable processing pipeline that is programmable by P4, C, Python, Broadcom Network Programming Language (NPL), or x86 compatible executable binaries or other executable binaries. A programmable processing pipeline can include one or more match-action units (MAUs) that can be configured to perform one or more of: determination of a relationship between a main timer and network timer, relationship between a main timer and ART, and/or relationship between network timer and ART, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content.

Packet allocator 624 can provide distribution of received packets for processing by multiple CPUs or cores using receive side scaling (RSS). When packet allocator 624 uses RSS, packet allocator 624 can calculate a hash or make another determination based on contents of a received packet to determine which CPU or core is to process a packet.

Interrupt coalesce 622 can perform interrupt moderation whereby network interface interrupt coalesce 622 waits for multiple packets to arrive, or for a time-out to expire, before generating an interrupt to host system to process received packet(s). Receive Segment Coalescing (RSC) can be performed by network interface 600 whereby portions of incoming packets are combined into segments of a packet. Network interface 600 provides this coalesced packet to an application.

Direct memory access (DMA) engine 652 can copy a packet header, packet payload, and/or descriptor directly from host memory to the network interface or vice versa, instead of copying the packet to an intermediate buffer at the host and then using another copy operation from the intermediate buffer to the destination buffer.

Memory 610 can be any type of volatile or non-volatile memory device and can store any queue or instructions used to program network interface 600. Transmit queue 606 can include data or references to data for transmission by network interface. Receive queue 608 can include data or references to data that was received by network interface from a network. Descriptor queues 620 can include descriptors that reference data or packets in transmit queue 606 or receive queue 608. Bus interface 612 can provide an interface with host device (not depicted). For example, bus interface 612 can be compatible with or based at least in part on PCI, PCI Express, PCI-x, Serial ATA, and/or USB (although other interconnection standards may be used), or proprietary variations thereof.

Figure 7:
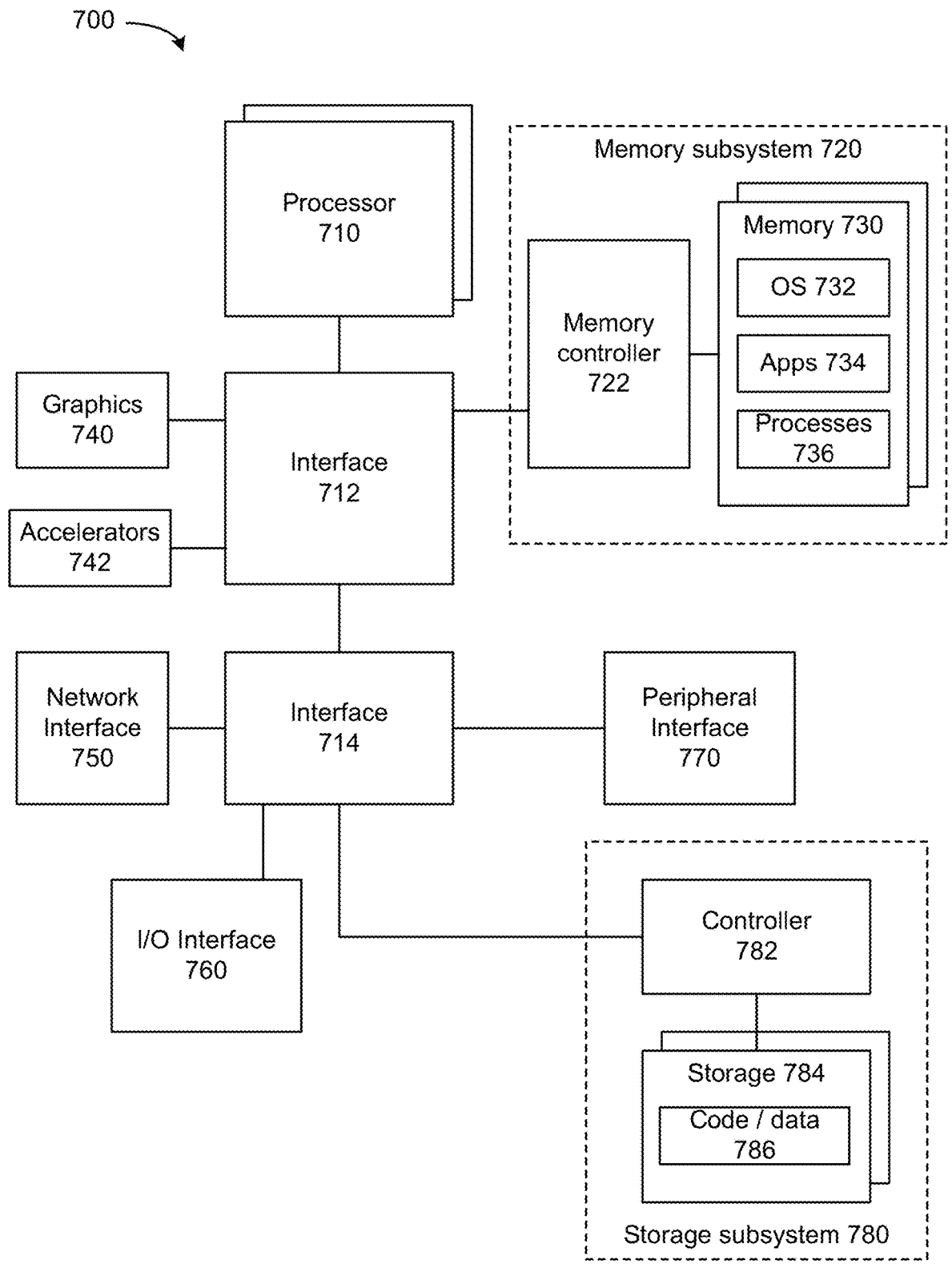
FIG. 7 depicts an example system.

FIG. 7 depicts an example computing system. System 700 can be used to program network interface device 750 to provide network packet time stamps with respect to main timer time stamps and main timer time stamps with respect to TSC values to one or more processors, as described herein. Processor 710 can determine a relationship between a network time stamp and a TSC value, as described herein, and make a derived network time stamp available to one or more processes. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

In some examples, OS 732 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. A processor-executed driver can cause network interface 750 to provide a network interface main timer time stamp relative to a TSC value and/or provide a network time stamp relative to a network interface main timer time stamp.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory.

Some examples of network interface 750 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples and includes at least one non-transitory computer-readable medium comprising instructions stored thereon, that if executed by one or more processors, cause the one or more processors to: for a first process executing on a processor of the one or more processors, determine at least one network timer time stamp based on a processor node timer.

Example 2 includes one or more examples, wherein the determine at least one network timer time stamp based on a processor node timer is based on (i) a relationship between the processor node timer and a network interface device main timer and (ii) a relationship between a network timer source and the network interface device main timer.

Example 3 includes one or more examples, wherein the at least one network timer time stamp based on a processor node timer is based on a relationship between Precision Time Protocol (PTP)-based time stamps and time stamps based on the processor node timer.

Example 4 includes one or more examples, wherein the at least one network timer time stamp based on a processor node timer is based on:

Precision Time Protocol (PTP) time stamp value= ($m2$((processor node timer time stamp value–$b1$)/$m1$))–$b2$, where:

$m1$ comprises a coefficient of a relationship between the processor node timer and a network interface device main timer;

$m2$ comprises a coefficient of a relationship between a network timer source and the network interface device main timer;

$b1$ comprises an offset in a relationship between the processor node timer and the network interface device main timer; and $b2$ comprises an offset in a relationship between the network timer source and the network interface device main timer.

Example 5 includes one or more examples, and includes instructions stored thereon, that if executed by one or more processors, cause the one or more processors to: receive, from a network interface device, data comprising (i) a time stamp value of a network interface device main timer and an associated processor node timer time stamp value and (ii) a Precision Time Protocol (PTP)-based time stamp and an associated time stamp of the network interface device main timer.

Example 6 includes one or more examples, wherein the determine at least one network timer time stamp based on a processor node timer is based on the data comprising (i) a time stamp value of the network interface device main timer and an associated processor node timer time stamp value and (ii) a Precision Time Protocol (PTP)-based time stamp and an associated time stamp of the network interface device main timer.

Example 7 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

Example 8 includes one or more examples, and includes instructions stored thereon, that if executed by one or more processors, cause the one or more processors to: for a second process executing on the processor of the one or more processors, determine at least one network timer time stamp based on the processor node timer.

Example 9 includes one or more examples, and includes an apparatus comprising: a first central processing unit (CPU) node to generate time stamp counter (TSC) values based on a first clock signal; a second CPU node to generate TSC values based on a second clock signal, wherein: the first CPU node is to determine at least one network timer time stamp based on the TSC values based on the first clock signal and the second CPU node is to determine at least one network timer time stamp based on the TSC values based on the second clock signal.

Example 10 includes one or more examples, wherein the determine at least one network timer time stamp based on the TSC values based on the first clock signal is based on (i) a relationship between the first clock signal and a network interface device main timer and (ii) a relationship between a network timer source and the network interface device main timer.

Example 11 includes one or more examples, wherein the determine at least one network timer time stamp based on the TSC values based on the first clock signal is based on:

Precision Time Protocol (PTP) time stamp value=
($m2$((processor node timer time stamp value–
$b1$)/$m1$))–$b2$, where:

m1 comprises a coefficient of a relationship between the first clock signal and a network interface device main timer;

m2 comprises a coefficient of a relationship between a network timer source and the network interface device main timer;

b1 comprises an offset in a relationship between the first clock signal and the network interface device main timer; and b2 comprises an offset in a relationship between the network timer source and the network interface device main timer.

Example 12 includes one or more examples, wherein the at least one network timer time stamp based on the TSC values based on the first clock signal is based on a relationship between Precision Time Protocol (PTP)-based time stamps and time stamps based on the first clock signal.

Example 13 includes one or more examples, wherein the first CPU node is to receive, from a network interface device, data comprising (i) a time stamp value of a network interface device main timer and an associated processor node timer time stamp value and (ii) a Precision Time Protocol (PTP)-based time stamp and an associated time stamp of the network interface device main timer.

Example 14 includes one or more examples, wherein the determine at least one network timer time stamp based on the TSC values based on the first clock signal is based on the data comprising (i) a time stamp value of the network interface device main timer and an associated processor node timer time stamp value and (ii) a Precision Time Protocol (PTP)-based time stamp and an associated time stamp of the network interface device main timer.

Example 15 includes one or more examples, and includes a network interface device, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

Example 16 includes one or more examples, and includes a server, rack, or a data center, wherein the at least one network timer time stamp is based on a network timer in one or more of the server, rack, or a data center.

Example 17 includes one or more examples, wherein the at least one network timer time stamp is based on one or more of: an Ethernet port time stamp based on IEEE 1588 or a global positioning system (GPS) signal.

Example 18 includes one or more examples, and includes a method comprising: determining at least one network timer time stamp relative to a processor timer and accessing the determined at least one network timer time stamp by a first or second process executing on a processor.

Example 19 includes one or more examples, wherein the determining at least one network timer time stamp relative to a processor timer is based on (a) a relationship between the processor timer and a network interface device main timer and (b) a relationship between a network timer source and the network interface device main timer.

Example 20 includes one or more examples, wherein at least one network timer time stamp is based on one or more of: an Ethernet port time stamp based on IEEE 1588 or a global positioning system (GPS) signal.

What is claimed is:

1. At least one non-transitory computer-readable medium comprising instructions stored thereon, that if executed by one or more processors, cause the one or more processors to:
   for a first process executing on a processor of the one or more processors, synchronize a time domain of the first process with a Precision Time Protocol (PTP)-based time domain of a network interface device based on at least one network timer time stamp and based on a processor node timer;
   for a second process executing on the processor of the one or more processors, synchronize a time domain of the second process with the PTP-based time domain of the network interface device based on at least one network timer time stamp and based on the processor node timer; and
   for a third process executing on a second processor of the one or more processors, synchronize a time domain of third second process with the PTP-based time domain of the network interface device based on at least one network timer time stamp and based on the processor node timer.

2. The computer-readable medium of claim 1, wherein the synchronize the time domain of the first process with the PTP-based time domain of the network interface device is based on (i) a relationship between the processor node timer and a network interface device main timer and (ii) a relationship between a network timer source and the network interface device main timer.

3. The computer-readable medium of claim 1, wherein the at least one network timer time stamp is based on a relationship between Precision Time Protocol (PTP)-based time stamps and time stamps based on the processor node timer.

4. The computer-readable medium of claim 1, wherein the PTP-based time domain of the network interface device is based on:

Precision Time Protocol (PTP) time stamp value= $(m_2((\text{processor node timer time stamp value}-b_1)/m_1))-b_2$, where:

$m_1$ comprises a coefficient of a relationship between the processor node timer and a network interface device main timer;

$m_2$ comprises a coefficient of a relationship between a network timer source and the network interface device main timer;

$b_1$ comprises an offset in a relationship between the processor node timer and the network interface device main timer; and $b_2$ comprises an offset in a relationship between the network timer source and the network interface device main timer.

5. The computer-readable medium of claim 1, comprising instructions stored thereon, that if executed by one or more processors, cause the one or more processors to:

receive, from the network interface device, data comprising (i) a time stamp value of a network interface device main timer and an associated processor node timer time stamp value and (ii) a Precision Time Protocol (PTP)-based time stamp and an associated time stamp of the network interface device main timer.

6. The computer-readable medium of claim 5, wherein the synchronize a time domain of the first process with a Precision Time Protocol (PTP)-based time domain of a network interface device based on the at least one network timer time stamp and based on the processor node timer is based on the data comprising (i) the time stamp value of a network interface device main timer and the associated processor node timer time stamp value and (ii) a PTP-based time stamp and the associated time stamp of the network interface device main timer.

7. The computer-readable medium of claim 1, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

8. An apparatus comprising:
a first central processing unit (CPU) node to generate time stamp counter (TSC) values based on a first clock signal;
a second CPU node to generate TSC values based on a second clock signal, wherein:
the first CPU node is to execute a first process,
the first CPU node is to execute a second process,
the first CPU node is to synchronize a time domain of the first process with a Precision Time Protocol (PTP)-based time domain of a network interface device based on at least one network timer time stamp and based on a processor node timer, and
the first CPU node is to synchronize a time domain of the second process with the PTP-based time domain of the network interface device based on at least one network timer time stamp and based on the processor node timer.

9. The apparatus of claim 8, wherein the synchronize the time domain of the first process with the PTP-based time domain of the network interface device is based on (i) a relationship between a first clock signal and a network interface device main timer and (ii) a relationship between a network timer source and the network interface device main timer.

10. The apparatus of claim 8, wherein the PTP-based time domain of the network interface device is based on:

Precision Time Protocol (PTP) time stamp value= $(m_2((\text{processor node timer time stamp value}-b_1)/m_1))-b_2$, where:

$m_1$ comprises a coefficient of a relationship between the first clock signal and a network interface device main timer;

$m_2$ comprises a coefficient of a relationship between a network timer source and the network interface device main timer;

$b_1$ comprises an offset in a relationship between the first clock signal and the network interface device main timer; and $b_2$ comprises an offset in a relationship between the network timer source and the network interface device main timer.

11. The apparatus of claim 8, wherein the first CPU node is to receive, from the network interface device, data comprising (i) a time stamp value of a network interface device main timer and an associated processor node timer time stamp value and (ii) a Precision Time Protocol (PTP)-based time stamp and an associated time stamp of the network interface device main timer.

12. The apparatus of claim 11, wherein the synchronize the time domain of the first process with the PTP-based time domain of the network interface device based on at least one network timer time stamp and based on the processor node timer is based on the data comprising (i) the time stamp value of a network interface device main timer and an associated processor node timer time stamp value and (ii) a PTP-based time stamp and an associated time stamp of the network interface device main timer.

13. The apparatus of claim 8, comprising the network interface device, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

14. The apparatus of claim 8, comprising a server, rack, or a data center, wherein the at least one network timer time stamp is based on a network timer in one or more of the server, rack, or a data center.

15. The apparatus of claim 8, wherein the at least one network timer time stamp is based on one or more of: an Ethernet port time stamp based on IEEE 1588 or a global positioning system (GPS) signal.

16. A method comprising:
determining at least one network timer time stamp relative to a processor timer;
accessing the determined at least one network timer time stamp by a first process executing on a processor;
accessing the determined at least one network timer time stamp by a second process executing on a processor;
synchronizing a time domain of the first process with a time domain of a network interface device based on the accessed determined at least one network timer time stamp; and
synchronizing a time domain of the second process with the time domain of the network interface device based on the accessed determined at least one network timer time stamp.

17. The method of claim 16, wherein the determining at least one network timer time stamp relative to the processor timer is based on (a) a relationship between the processor timer and a network interface device main timer and (b) a relationship between a network timer source and the network interface device main timer.

18. The method of claim 16, wherein at least one network timer time stamp is based on one or more of: an Ethernet port time stamp based on IEEE 1588 or a global positioning system (GPS) signal.

* * * * *